United States Patent
Hedelin et al.

(10) Patent No.: US 11,351,561 B2
(45) Date of Patent: Jun. 7, 2022

(54) APPARATUS FOR PREPARING CUSTOM PERFUMES

(71) Applicants: John Martin William Hedelin, Malmö (SE); Geisha Nathali Montes De Oca Robles, Los Angeles, CA (US)

(72) Inventors: John Martin William Hedelin, Malmö (SE); Geisha Nathali Montes De Oca Robles, Los Angeles, CA (US)

(*) Notice: Subject to any disclaimer, the term of this patent is extended or adjusted under 35 U.S.C. 154(b) by 0 days.

(21) Appl. No.: 17/187,988

(22) Filed: Mar. 1, 2021

(65) Prior Publication Data
US 2022/0080438 A1 Mar. 17, 2022

Related U.S. Application Data

(60) Provisional application No. 62/953,986, filed on Dec. 27, 2019.

(51) Int. Cl.
*B05B 11/00* (2006.01)
*A45D 34/02* (2006.01)
*A45D 34/00* (2006.01)

(52) U.S. Cl.
CPC .......... *B05B 11/0081* (2013.01); *A45D 34/02* (2013.01); *B05B 11/0054* (2013.01); *B05B 11/3083* (2013.01); *A45D 2034/005* (2013.01); *A45D 2200/058* (2013.01)

(58) Field of Classification Search
CPC . A61L 9/125; B05B 11/0081; B05B 11/0054; B05B 11/3083; B05B 11/0078; B05B 11/3081; A45D 34/02; A45D 2034/005; A45D 2200/058
See application file for complete search history.

(56) References Cited

U.S. PATENT DOCUMENTS

| 6,371,451 | B1 | 4/2002 | Choi | |
| 8,593,634 | B1* | 11/2013 | Igarashi | B01F 33/844 356/402 |
| 2001/0047309 | A1* | 11/2001 | Bartholomew | G06Q 30/0601 132/200 |
| 2005/0087562 | A1* | 4/2005 | Koide | B01F 25/3132 222/252 |
| 2007/0012378 | A1* | 1/2007 | Miller | B44D 3/08 222/135 |
| 2007/0258849 | A1* | 11/2007 | Kent | A61L 9/145 422/123 |

(Continued)

*Primary Examiner* — Patrick M. Buechner (57) ABSTRACT

An apparatus for creating custom perfumes is disclosed. The apparatus may comprise a body that may hold perfume refills and a mixing chamber connected to the perfume refills via a plurality of valves. The apparatus may be controlled by a microcontroller. The apparatus may receive custom formulas for creating custom perfumes from users. Upon receiving the formula, the apparatus may determine the quantities of perfumes that are to be added from each perfume refill to create the custom perfume. Further, a vacuum pump connected to the mixing chamber is activated. The amount of time required to extract the determined quantity of perfume from the refills to the vacuumized mixing chamber is calculated. Finally, the valves are opened for the calculated amount of time to allow the vacuum generated in the mixing chamber to extract the determined quantities of perfumes from each perfume refill to create the custom perfume.

14 Claims, 7 Drawing Sheets

(56) References Cited

U.S. PATENT DOCUMENTS

| | | | |
|---|---|---|---|
| 2010/0318220 A1* | 12/2010 | Saranow | A45D 44/02 |
| | | | 700/239 |
| 2011/0011490 A1* | 1/2011 | Rodrigues | A45D 44/005 |
| | | | 141/69 |
| 2012/0247613 A1 | 10/2012 | Behbehani | |
| 2015/0021356 A1* | 1/2015 | Witchell | B01F 33/848 |
| | | | 222/23 |
| 2015/0059790 A1* | 3/2015 | Sandow | A45D 34/041 |
| | | | 132/200 |
| 2016/0045838 A1 | 2/2016 | Burland et al. | |
| 2016/0132950 A1* | 5/2016 | Fleming | G06Q 30/0621 |
| | | | 705/26.5 |
| 2017/0228959 A1* | 8/2017 | Bothos | B67D 7/80 |
| 2019/0366285 A1* | 12/2019 | Brandon | A61Q 1/06 |
| 2020/0047140 A1* | 2/2020 | Layton | A45D 34/00 |
| 2020/0078485 A1 | 3/2020 | Suarez Iribarne et al. | |
| 2020/0111142 A1* | 4/2020 | Samain | G06Q 30/0621 |
| 2020/0276549 A1* | 9/2020 | Jedlinski | B01F 33/846 |
| 2020/0281340 A1* | 9/2020 | Matsuda | A45D 44/005 |
| 2021/0100923 A1* | 4/2021 | Gimenoasin | B01F 33/8442 |
| 2021/0138415 A1* | 5/2021 | Duerinck | B01F 33/85 |

\* cited by examiner

APPARATUS FOR PREPARING CUSTOM PERFUMES

CROSS-REFERENCE TO RELATED APPLICATIONS

This application claims the benefit of U.S. Provisional Patent Application Ser. No. 62/953,986, entitled "Smart Perfume Bottle", filed on Dec. 27, 2019, which is incorporated herein in its entirety.

TECHNICAL FIELD

The present disclosure is related to the field of perfume mixers. More particularly, the present disclosure is related to a smart apparatus for preparing custom fragrances.

BACKGROUND

Perfume is a mixture of fragrant essential oils or aroma compounds, fixatives and solvents, usually in liquid form, used to give the human body, animals, food, objects, and living-spaces an agreeable scent. Ancient texts and archaeological excavations show the use of perfumes in some of the earliest human civilizations. Originally these aesthetically pleasing fragrances were commonly isolated in raw form as resins, gums or essential oils from natural sources, inter alia, the bark, roots, leaves and fruit of indigenous plants. These resins, gums, and oils were directly applied to the body or diluted with water or other solvents, including in some cases, wine.

The word perfume derives from the Latin perfumare, meaning "to smoke through". Perfumery, as the art of making perfumes, began in ancient Mesopotamia, Egypt, the Indus Valley Civilization and possibly Ancient China. It was further refined by the Romans and the Arabs. The world's first-recorded chemist is considered to be a woman named. Tapputi, a perfume maker mentioned in a cuneiform tablet from the 2nd millennium BC in Mesopotamia. She distilled flowers, oil, and calamus with other aromatics, then filtered and put them back in the still several times.

Modern perfumery began in the late 19th century with the commercial synthesis of aroma compounds such as vanillin or coumarin, which allowed for the composition of perfumes with smells previously unattainable solely from natural aromatics. With the advent of modern chemistry, individual components responsible for the odor properties of these resins, gums and oils were isolated and subsequently characterized. Modern perfumery involves the artful compounding of fragrance to achieve novel fragrance compositions having defined "characteristics".

Typically, perfumes are sold across the world by bottling them in a 'perfume bottle'. The perfume bottle traps fragrance mixtures, typically in liquid form in a customized bottle. The perfume is dispensed either by tilting the bottle or using a specialized nozzle which diffuses a very small quantity of perfume out from the bottle. Since the composition of perfumes is typically very complex, they are generally classified according to the fragrance they produce. At present, perfumes are classified based on families, and techniques such as fragrance pyramids are used to identify them. Apart from classification based on olfactive families, fragrances are also classified using fragrance wheels. Some examples of classification of fragrances include: single floral, floral bouquet, amber/oriental, woody, leather, bright floral, green, aquatic, oceanic, citrus, fruit, gourmand, aromatic, spicy, and the like.

Conventional perfume bottles are restricted to diffusing only a specific fragrance, the biggest disadvantage with such a system is that users may get bored of a fragrance and would have to buy new perfume bottles altogether if they want to try a new fragrance. Moreover, this leads to a lot of wastage since discarding unused and/or partially used perfume bottles are very common across the world. Moreover, some users may want to mix and match fragrances according to their taste. Conventional perfume bottles do not provide the option such experiments thereby severely restricting the usage of perfume bottles.

A modern perfume bottle that allows users to customize fragrances and allows them to experiment with fragrances will be highly appreciated by perfume makers and perfume lovers. As such, there are no simple solutions, apparatuses or methods that allow experimentalists to try their hand with perfumes in a convenient manner.

The present disclosure addresses the abovementioned technical deficiencies of conventional perfume bottles to provide a state of the art solution for perfume users to customize and use perfumes according to their liking.

SUMMARY

In light of the disadvantages mentioned in the previous section, the following summary is provided to facilitate an understanding of same of the innovative features unique to the present invention and is not intended to be a full description. A full appreciation of the various aspects of the invention can be gained by taking the entire specification and drawings as a whole.

Embodiments described herein disclose a smart perfume-making apparatus that may allow users to create customized fragrances. The apparatus may comprise of a body that may allow one or more perfume refills to be inserted into the body via one or more refill slots. The apparatus may hold a plurality of perfume refills having different fragrances at a time. Furthermore, the apparatus may allow users to communicate with the apparatus and provide instructions to it via a user interface. Herein, a microcontroller disposed within the body of the apparatus may be programmed to receive custom perfume formulas from the users. Users may provide formulas comprising specific ratios of certain fragrances that are to be mixed to create a new fragrance. Upon receiving the inputs from users specifying the ratios of perfumes that are to be added from each of the one or more perfume refills, the apparatus may determine the quantity of perfume that may be added from each of the one or more perfume refills. Upon determining the quantity, the apparatus may further calculate the amount of time required to extract the determined quantity of perfume from each of the one or more refills.

Furthermore, the apparatus may calculate the amount of time required to extract the determined quantity of perfume from each of the one or more refills. Further, the apparatus may activate a vacuum pump that connects a mixing chamber to the one or more refills to generate a vacuum inside the mixing chamber. Based on the calculations, the apparatus may open the connections between the valves and the mixing chamber via a plurality of valve actuators. The apparatus may open the plurality of valves for the calculated amount of time thereby allowing the vacuum generated in the mixing chamber to draw out/extract the determined quantities of perfumes from each of the one or more perfume refills into the mixing chamber for generating the custom perfume according to the formula provided by the user.

This summary is provided merely for purposes of summarizing some example embodiments, to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description and figures.

The abovementioned embodiments and further variations of the proposed invention are discussed further in the detailed description.

The drawings described herein are for illustration purposes only and are not intended to limit the scope of the present subject matter in any way.

DETAILED DESCRIPTION

Embodiments described herein discloses an apparatus and a method for creating custom perfumes. The primary components of the apparatus include a body, a plurality of refills, a plurality of valves, a plurality of valve actuators, a mixing chamber, a vacuum pump, a fluid pump, a microcontroller, a display, and a diffuser. In addition to the above, there are several other secondary components that support the primary components to allow the smooth functioning of the apparatus.

The apparatus allows users to create custom perfumes by instructing the apparatus to mix one or more fragrances in a user-defined ratio. Herein, the user may select one or more fragrances from the available list of fragrances and assign a specific ratio in which the selected fragrances are to be mixed. The combination of fragrances and the ratio defined by the user will be referred to as a 'custom formula' throughout this disclosure. The custom formula may be communicated to the microcontroller that is provided within the apparatus. The microcontroller herein is configured to control various functionalities of the apparatus including receiving user instructions, receiving the custom formula, managing the user interface, managing the mixing process, diffusing the created custom perfume, and the like.

One or more perfume refills may be fixed into the apparatus for the purpose of mixing and creating custom perfumes. Herein, the perfume refills may comprise fragrances in liquid form, they may be fixed into the apparatus inside the slots provided for holding them. The apparatus keeps track of the total number of perfume refills that are fixed into the apparatus at any given time. The apparatus further keeps track of the fragrance assigned to each of the perfume refills and the amount of perfume remaining in each of the refills. At any given time, the apparatus may be aware of the current status of refills including the total number of refills available, fragrance of each refills, and amount of perfume remaining in each refill. The microcontroller and a plurality of sensors disposed within the apparatus helps the apparatus in keeping track of the abovementioned details. Furthermore, such data are stored in a memory that is coupled to the microcontroller.

It may be noted that the apparatus described herein may be referred to as "perfume bottle" or "smart perfume bottle" interchangeably throughout this document as per the context of the sentence. The terms "perfume", "scent", and "fragrance" may be used interchangeably throughout this document. The terms used herein do not restrict the scope of the present disclosure.

Figure 1:
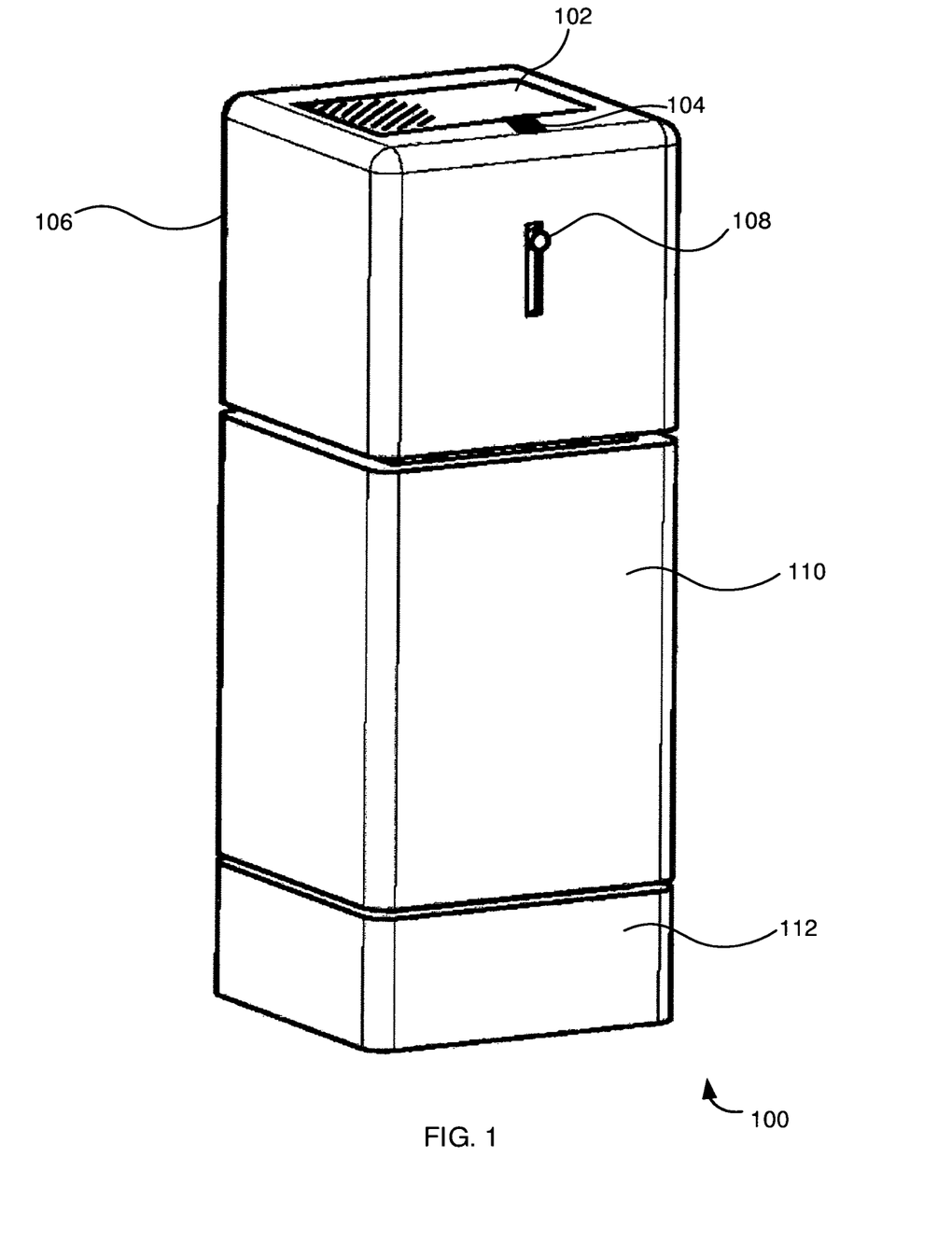
FIG. 1 is a perspective view of an exemplary apparatus for creating custom perfumes according to the embodiments of the present disclosure.

Before moving to the subsequent sections of this disclosure that describes the working of the apparatus in detail, it is pertinent to refer to the various numbering provided in the drawings. Referring to the drawings, FIG. 1 is a perspective view 100 of an exemplary apparatus for creating custom perfumes. The apparatus comprises a main body that acts as a perfume bottle cum mixer. The main body further comprises an upper shell 106, a middle shell 110, and a shell base 112. The upper shell 116 hosts a nozzle opening 108 through which custom-made perfume may be partially diffused. The upper portion of the apparatus may further comprise a display 102 and a sampler slot 104. It may be noted that the outer shell of the apparatus may be designed in various shapes and sizes as understood by a person skilled in the art. The depictions provided herein do not restrict the scope of the present invention. They are meant merely for the purpose of illustration.

Figure 2:
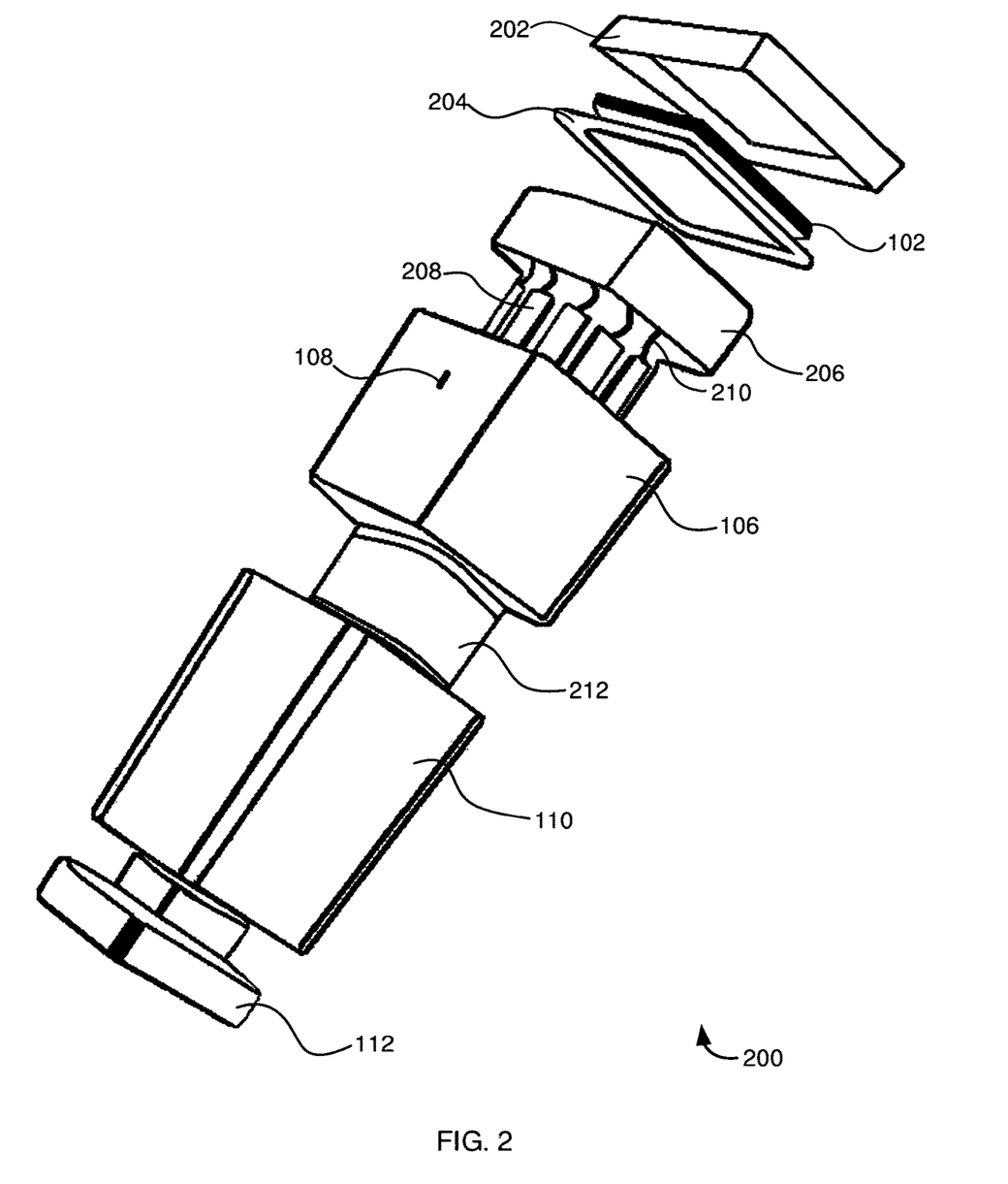
FIG. 2 is an exemplary view depicting the primary components of the apparatus for creating custom perfumes according to the embodiments of the present disclosure.

FIG. 2 is an exemplary view 200 depicting the primary components of the apparatus for creating custom perfumes. The apparatus is covered from the top by an upper shell 202 below which the display 102 is provided. A main printed circuit board (PCB) 204 which hosts the main electronic components of the apparatus such as the microcontroller and the memory is provided within the upper shell 106. Furthermore, perfume refills 208 extends into the middle shell insert 212. The perfume refills 208 are connected to the mixing chamber 206 via connecting tubes 210. One end of the connecting tube 210 may be connected to the perfume refill 208 while the other end may be connected to the valves which in turn interfaces the connecting tubes 210 to the mixing chamber 206.

Figure 3:
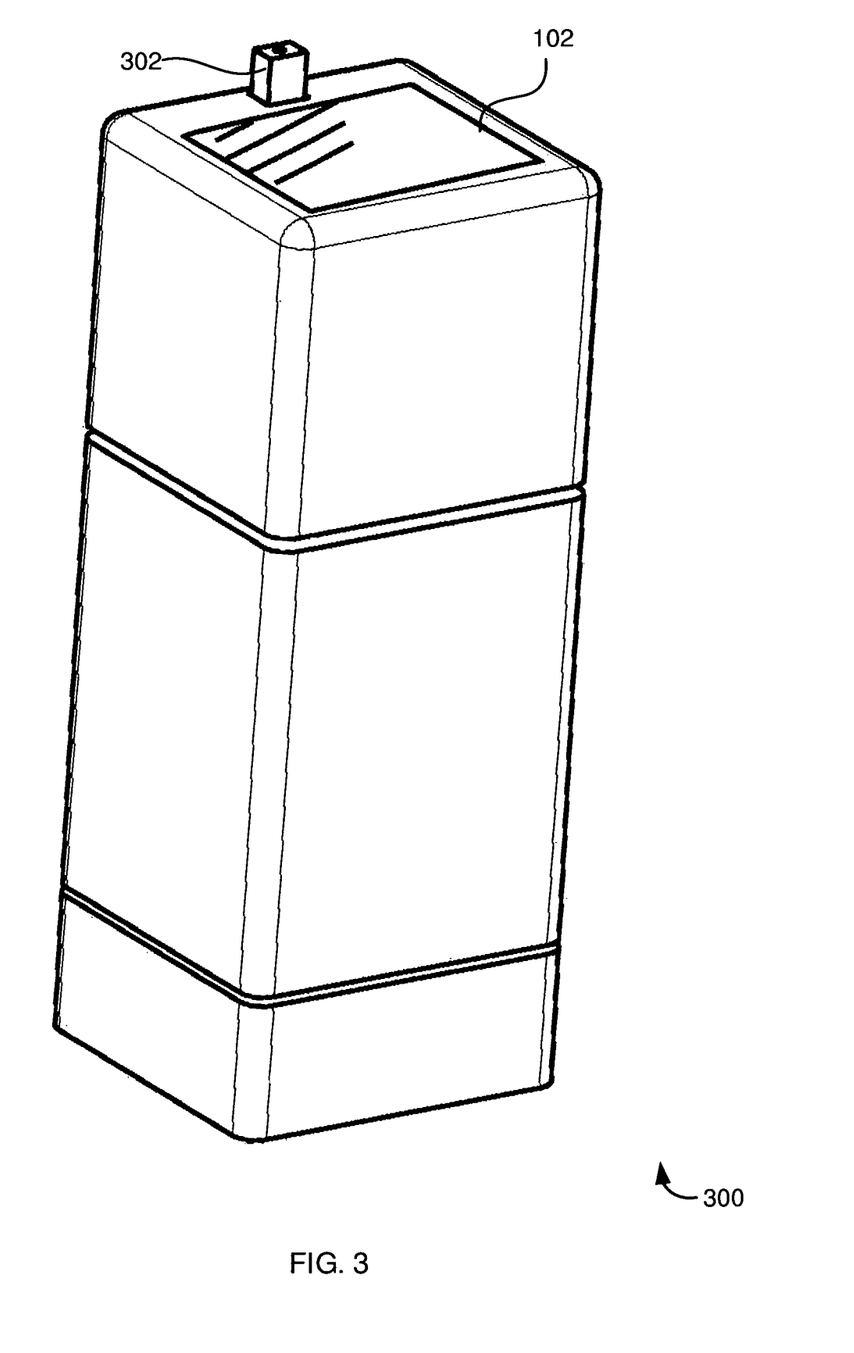
FIGS. 3 and 4 are perspective views of an exemplary apparatus for creating custom perfumes according to the embodiments of the present disclosure.
Figure 4:
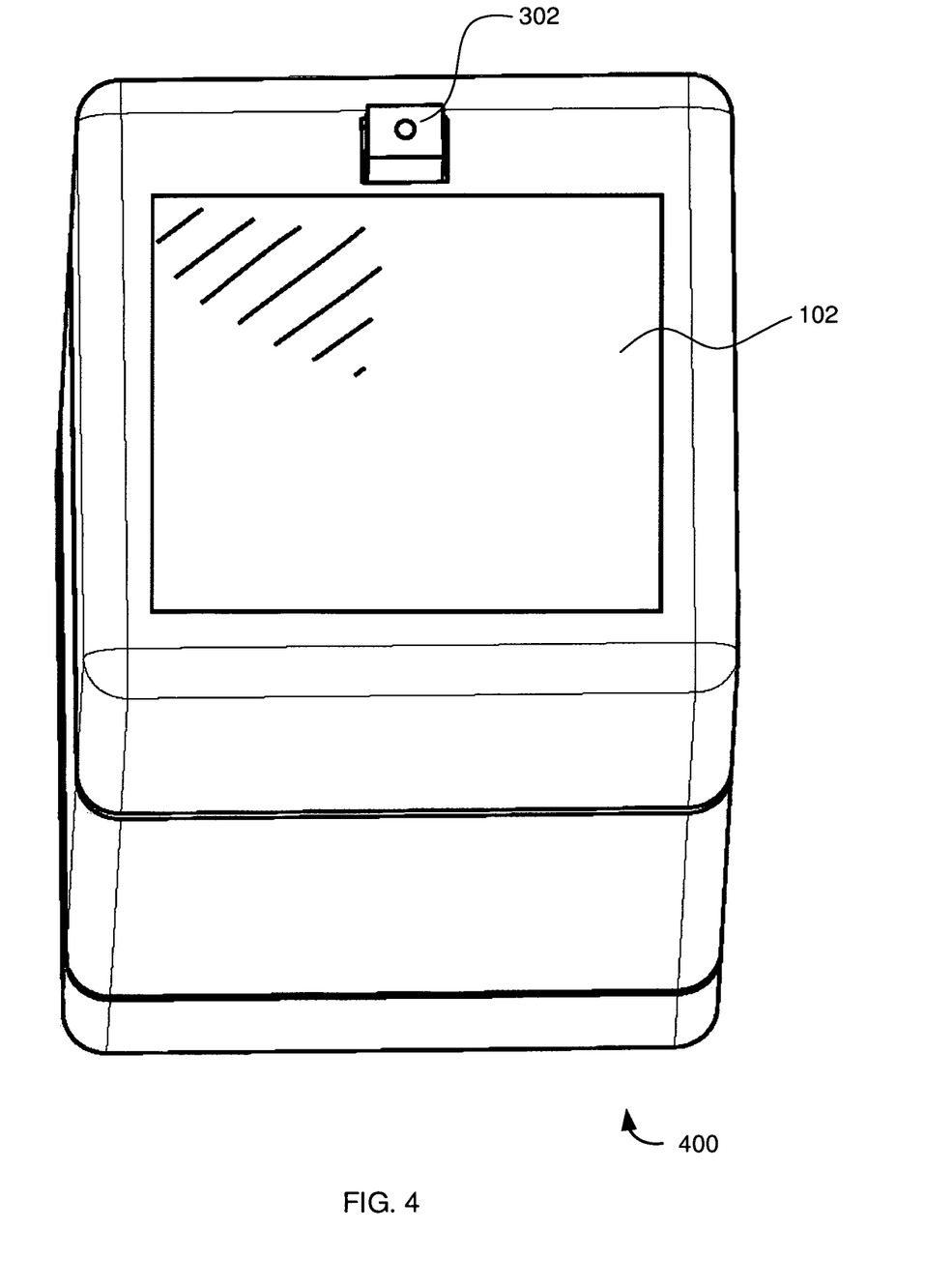

FIGS. 3 and 4 are perspective views 300 and 400 of the exemplary apparatus for creating custom perfumes. FIGS. 3 and 4 depict a use case wherein a sampler tube 302 is inserted into the sampler slot 104. The apparatus may either be used as a perfume bottle that dispenses a small amount of custom perfume via nozzle opening 108 or may be used for collecting the entire custom perfume into a sampler tube 302. This way, users who create a customized fragrance can easily collect and carry around the custom fragrance they created using their custom formula. This option provides a convenient solution for creating and carrying around custom-made fragrances easily with very little effort. Herein, the microcontroller may instruct the dispatcher to either route the custom perfume into the sampler tube 302 or into a pressurized chamber that is connected to the nozzle. A fluid pump performs the process of routing the custom perfume from the mixing chamber 206 to the sampler tube 302 or to the pressurized chamber.

Figure 5:
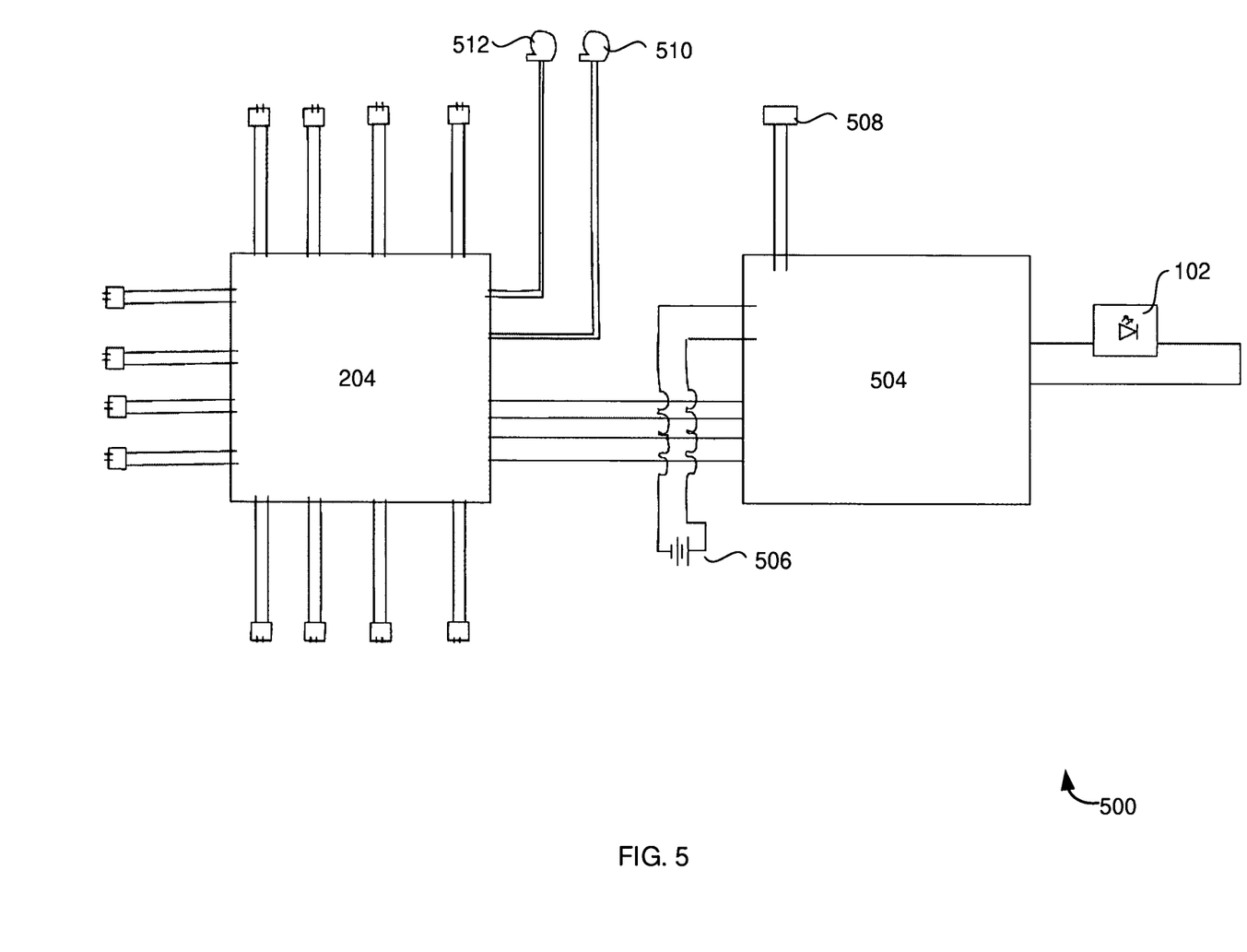
FIG. 5 is an exemplary circuit diagram depicting the primary components of the apparatus for creating custom perfumes according to the embodiments of the present disclosure.

FIG. 5 is an exemplary circuit diagram 500 depicting the primary components of the apparatus for creating custom perfumes. Herein, the main Printed Circuit Board (PCB) 204 and the Light Emitting Diode (LED) PCB 504 works together to manage the apparatus and communicate with users. Battery 506 powers the entire apparatus. Battery 506 may be replaceable or rechargeable. A communication module 508 allows the apparatus to communicate with electronic devices paired with the apparatus via wired/wireless communication techniques. The main PCB 204 controls the vacuum pump via controlling interface 510 and the fluid pump via 512. Display 102 may be connected to the LED PCB 504 for allowing direct communication with users. Users may provide inputs to the apparatus via a touchscreen-based display 102. Alternatively, a set of physical buttons may be provided on the apparatus to accept inputs.

In one example, the apparatus may be accessed via a software application installed in an electronic device. The apparatus may be connected to the electronic device using wired/wireless communication techniques. The custom formula may be uploaded to the device via the electronic device through a wired/wireless network. The electronic device may be a personal computer, a laptop, a desktop computer, a smartphone, a smart wearable device, and the like. The electronic device may be paired with the apparatus via a wired connection or via a wireless communication network such as Wi-Fi, NFC, Bluetooth, 4G, 5G, or any well-known wireless communication as understood by a person skilled in the art.

Figure 6:
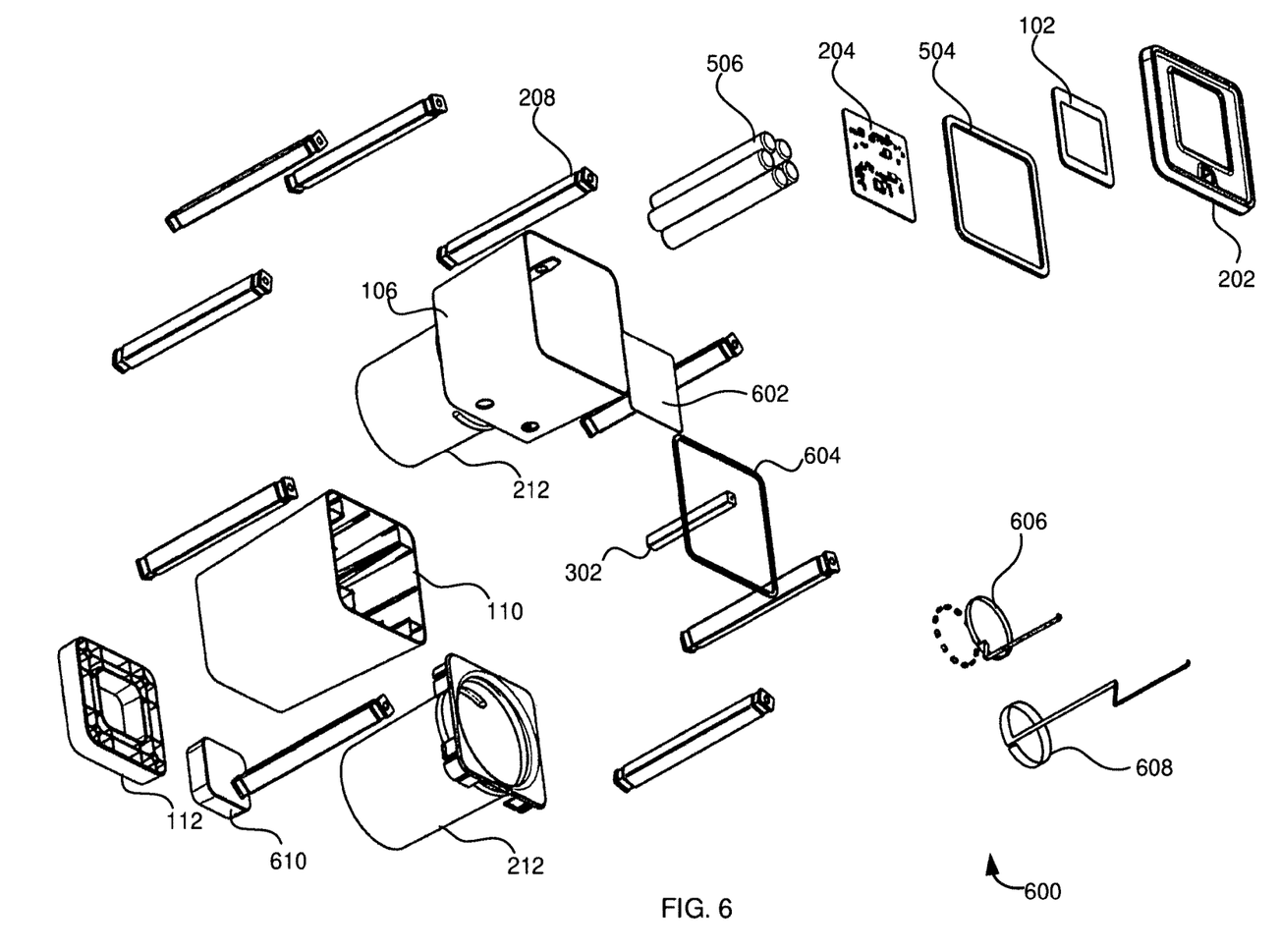
FIGS. 6 and 7 are exploded views of the apparatus depicting various components of the apparatus for creating custom perfumes according to the embodiments of the present disclosure.

FIGS. 6 and 7 are exploded views 600 and 700 of the apparatus depicting various components of the apparatus for creating custom perfumes. According to FIG. 6, the upper shell 202 covers the display 102, the main PCB 204, and the LED PCB 504. Furthermore, a touch panel 602 and an LED cover 604 may be provided to support the display 102. A tube presence detector 606 provides data to the microcontroller about the presence/absence of the perfume refills 208 in the apparatus. An antenna 608 may be provided for assisting the communication module 508. Furthermore, a dead weight 610 may be provided near the shell base 112 to keep the apparatus study when placed on a surface.

Figure 7:
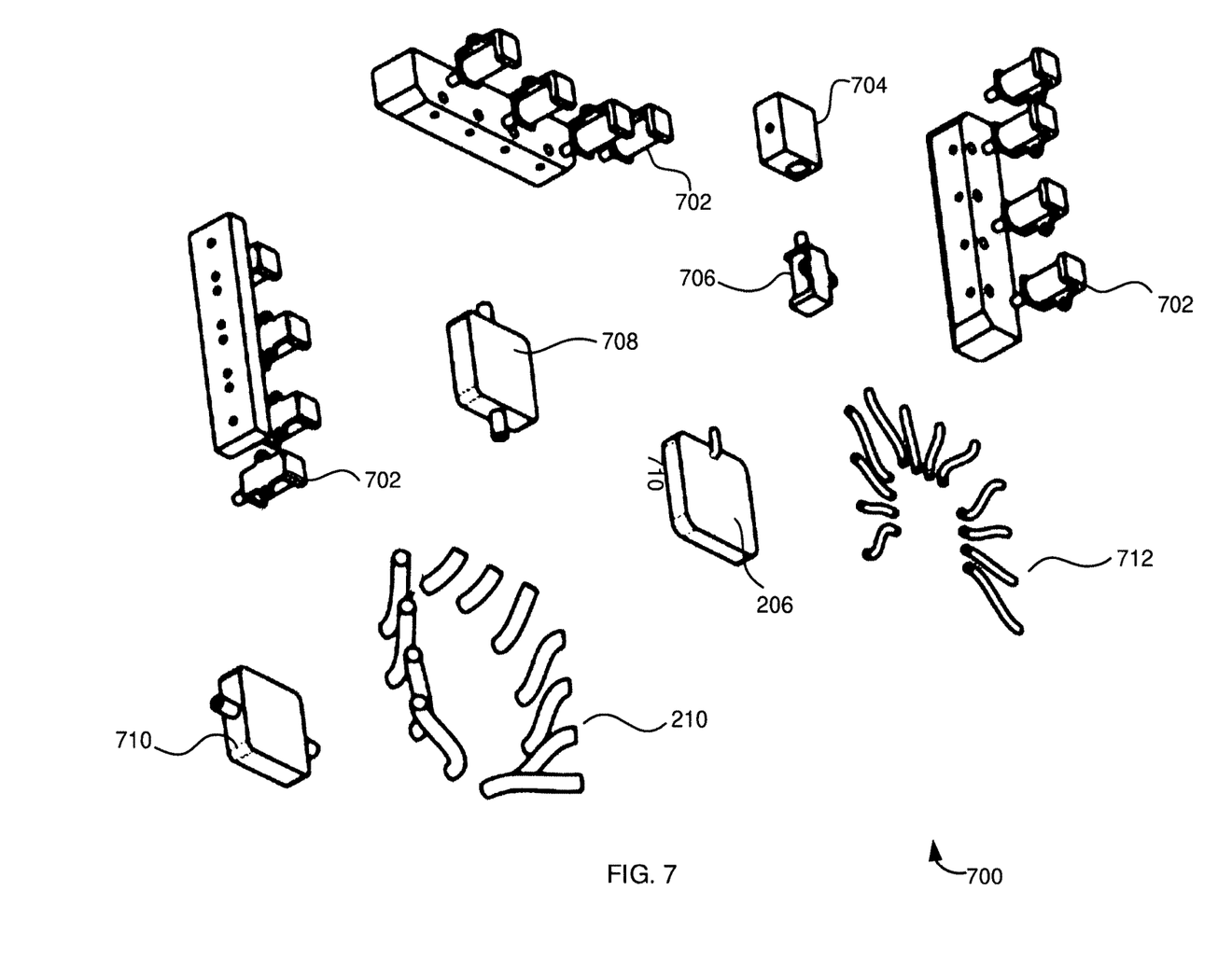

FIG. 7 depicts an exploded view 700 of the components present inside the mixing chamber 206. The plurality of valves actuators 702 may be used to control the flow of liquid from the mixing chamber 206 to the perfume refill 208 via connecting tubes 210. When the apparatus is configured to release a small amount of custom perfume, the nozzle 704 may be activated using a dispatcher actuator 706. Physical pressure may be applied onto the nozzle 704 via the dispatcher actuator 706 to dispense the custom perfume partially from a pressurized chamber. Vacuum pump 708 may be responsible for generating vacuum inside the mixing chamber 206 for extracting perfumes from the perfume refills 208 via connecting tubes 210. The fluid pump 710 may be responsible for transferring the mixed custom perfume from the mixing chamber 206 to the pressurized chamber or to the sampler tube 302 via output tubes 712.

In one example, the vacuum pump 708 may be activated by the microcontroller to generate vacuum inside the mixing chamber 206. Further, the microcontroller opens the valves connecting the mixing chamber 206 and the perfume refills 208 using the valve actuator 702 for a specific period of time as calculated by the microcontroller depending on the amount of perfume required from a specific perfume refill to create the custom perfume based on the custom formula uploaded by the user. When the valve is opened, the vacuum chamber naturally extracts fluid from the perfume refill 208 into the mixing chamber 206. The microcontroller automatically closes the valves once the calculated time is completed. Moreover, the microcontroller may further determine the amount of perfume fluid extracted to double-check the ratios via a plurality of sensors that are capable of determining weights. Herein, as the vacuum pump 708 applies a vacuum into the mixing chamber 206, the microcontroller may activate the opening of a specific valve for a precise amount of time, and thereby measure and transfer a precise volume of liquid passing through this channel.

The apparatus may be operated by a user using two different mechanisms either individually or in combination, i.e., the device may be operated independently, or using the connected software application, or by a combination of both. The apparatus is provided with a screen that displays various details such as battery percentage, tube status, formula information, user information, and/or device information. Furthermore, the apparatus may be connected to a computer-based software application as well. The software application may be web-based or locally stored and, may be installed in any electronic, device that supports wired/wireless communication interface. Exemplary devices include laptops, personal computers, tablets, phablets, smartphones, smart watch, and the like. The software application may interact with the apparatus for the purpose of providing instruction to the apparatus.

Furthermore, the software application may be used for searching through a catalogue of formulas that are available within a web-based community of enthusiasts, purchasing specific formulas form other users, uploading specific formulas created by the user, controlling the mixing process of the device, creating new formulas using the apparatus, receiving status from the apparatus, and other ancillary operations. The apparatus along with the software application makes the apparatus an intelligent device and aids in creating custom formulas instantaneously. The ratio and quantity of each fragrance extracted from one or more perfume refills may be adjusted using the software application.

Furthermore, the apparatus may be powered by using one or more batteries. The batteries may be replaced or charged for powering the device. The apparatus may also be used as a plug-and-play device by directly connecting with a power adaptor in case the battery is not available.

An exemplary use case of the present disclosure is described herein wherein the steps of creating a custom per are described below. First, the user may switch on the device. Further, perfume refills 208 may be inserted into the device. Next, the user may connect/pair the device with an electronic device such as a smartphone that has a supporting software application installed to it. Once the device is connected, the user may select from a wide range of supporting fragrances that are available. In another embodiment, the user may upload any formula to the device, upon receiving the input from a user, the software application may filter the formulas and even modify them to provide the closest optimal output or alternate suggestions based on the perfume refills 208 that are currently connected to the device. Furthermore, the user may also adjust the ratio and quantity of the fragrances to generate a custom fragrance. The device mixes the liquids accordingly to generate scents which may either be transferred to another sampler tube 302 or may be applied directly through the nozzle opening 108.

The software application provides complete control over the quantity, ratio, intensity, and other related parameters of the ingredients that may be used for producing scents. Such comprehensive control allows users to either use readily available formulas or create custom formulas for generating custom aromas. Hence, the device mentioned herein provides an instant scent maker which is smart and intuitive. The software application allows users to upload their custom formulas to the catalogue network. This facility allows the user to create and sell his/her own formula thereby benefitting both the user and the community.

Herein, a catalogue network may comprise a distributed space wherein a list of all available perfume formulas and products related to it is made available. The catalogue network may be accessed via any electronic device with network connectivity. Users may upload new formulas and products related to it to the catalogue network. Similarly, users may buy or sell formulas and related products from the catalogue network. Users may also upload new formulas to the catalogue network and make them available for free for other users in the community. The term 'catalogue network' is used merely for the purpose of explanation, terms used herein does not limit the scope of the present invention. The catalogue network may be compared to an online marketplace, an online research and development space, discussion forum, etc., with respect to the use-cases of the present invention. Furthermore, users within the community can rate each formula and product, provide their reviews, and discuss product features.

The perfume refills 208 may be filled generally with liquid-based fragrance. Alternatively, fragrances in a semi-solid/gaseous state may also be filled in the perfume refill 208. A plurality of valves interfaces the plurality of perfume refills 208 with the mixing chamber 206 via connecting tubes 210. The plurality of valves that connect the perfume refills 208 to the mixing chamber 206 are controlled by the microcontroller via a plurality of valve actuators. The microcontrollers and the apparatus as such may be powered by connecting the apparatus directly to an Alternating Current (AC)/Direct Current (DC) power source as well.

Components of electronic device for creating perfumes may be any combination of hardware and programming to implement the functionalities described herein. In some implementations, the programming may be processor-executable instructions stored on a non-transitory machine-readable storage medium (e.g., memory), and the hardware may include at least one processing resource to retrieve and/or execute those instructions. Microcontroller(s)/Processors used in the apparatus and the supporting electronic device may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. Processor(s) thus may also include the functionality to encode messages and/or data or information. Processor(s) may include, among other things, a clock, an arithmetic logic unit (ALU) and logic gates configured to support operation of processor(s). Further, the processor(s) may include functionality to execute one or more software programs, which may be stored in the memory or otherwise accessible to processor(s).

The apparatus and the electronic device may further include a memory that stores instructions to be executed by the processor for performing the above-mentioned functionalities. Memory, may store any number of pieces of information, and data, used by the system to implement the functions of the system. The memory may include for example, volatile memory and/or non-volatile memory. Examples of volatile memory may include but are not limited to volatile random-access memory (RAM). The non-volatile memory may additionally or alternatively comprise an electrically erasable programmable read only memory (EEPROM), flash memory, hard drive, and the like. Some examples of the volatile memory include, but are not limited to, dynamic RAM, static RAM, and the like. Some example of the non-volatile memory includes, but are not limited to, hard disks, magnetic tapes, optical disks, programmable read only memory, erasable programmable read only memory, electrically erasable programmable read only memory, flash memory, and the like. Memory may be configured to store information, data, applications, instructions or the like for enabling the system to carry out various functions in accordance with various example embodiments. Additionally, or alternatively, the memory may be configured to store instructions which when executed by processor(s) causes the system to behave in a manner as described in various embodiments.

In one implementation, the network that connects the electronic device to the apparatus may be a wireless network, a wired network or a combination thereof. The network may be implemented as one of the several types of networks, such as intranet, local area network (LAN), wide area network (WAN), the internee, and the like. The network may either be a dedicated network or a shared network. The shared network represents an association of the several types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications, and changes may be made without departing from the spirit of the present solution. All the features disclosed in this specification (including any accompanying claims, abstract, and drawings), and all of the steps of any method or process so disclosed, may be combined in any combination, except combinations where at least some of such features or steps are mutually exclusive.

The terms "include," "have," and variations thereof, as used herein, have the same meaning as the term "comprise" or an appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. An apparatus for creating custom perfumes, comprising:
   a body;
   one or more perfume refills inserted into the body via one or more refill slots provided in the body;

a mixing chamber disposed within the body, wherein the mixing chamber is connected to the one or more perfume refills via a plurality of valves; and a microcontroller disposed within the body programmed to perform the steps of:
  receiving, inputs from a user specifying ratios of perfumes that are to be added from each of the one or more perfume refills;
  determining quantities of perfumes that are to be added from each of the one or more perfume refills based on the inputs received from the user;
  activating a vacuum pump connected to the mixing chamber to generate a vacuum in the mixing chamber;
  calculating the amount of time required to extract the determined quantity of perfume from each of the one or more perfume refills upon opening the plurality of valves connecting the one or more refills and the vacuumized mixing chamber; and
  opening the plurality of valves for the calculated amount of time thereby allowing the vacuum generated in the mixing chamber to extract the determined quantities of perfumes from each of the one or more perfume refills into the mixing chamber for creating the custom perfume.

2. The apparatus of claim 1, wherein each of the one or more perfume refill is filled with a liquid-based fragrance.

3. The apparatus of claim 1, wherein the custom perfume can be dispatched fully into a sampler tube upon the use providing instructions to the microcontroller for dispatching the entire contents of the mixing chamber to the sampler tube.

4. The apparatus of claim 1, wherein the plurality of valves that connect the perfume refills to the mixing chamber are controlled by, the microcontroller via a plurality of valve actuators.

5. The apparatus of claim 1, wherein the user inputs are received via a plurality of buttons provided on the body of the apparatus.

6. The apparatus of claim 1, wherein the user inputs are received via a touchscreen display provided on the body of the apparatus.

7. The apparatus of claim 1, wherein the apparatus is powered using a replaceable or rechargeable battery.

8. The apparatus of claim 1, wherein the apparatus is powered by connecting the apparatus directly to an Alternating Current (AC)/Direct Current (DC) power source.

9. The apparatus of claim 1, wherein the body further comprises of a top shell, a middle shell, a shell base, a middle shell insert, a top shell cover, a display, a touch panel, connecting tubes, output tubes, valve actuators, fluid pumps, a tube presence detector, antennas, and printed circuit boards.

10. The apparatus of claim 1, wherein the custom perfume is transferred from the mixing chamber to a pressurized chamber.

11. The apparatus of claim 10, wherein the custom perfume can be dispatched partially from the pressurized chamber by physically applying a pressure on an actuator that connects the pressurized chamber with a nozzle.

12. The apparatus of claim 1, wherein the apparatus further comprises a communication module capable of sending and receiving data via wired or wireless transmission mechanisms.

13. The apparatus of claim 12, wherein the user inputs are received via a user interface provided in an electronic device and the received inputs are transferred from the electronic device to the apparatus using the communication module.

14. The apparatus of claim 13, wherein the electronic device includes at least one of: a laptop computer, a desktop computer, a tablet, a smartphone, and a smart wearable device.

* * * * *